US009671743B2

(12) United States Patent
Ikeda (10) Patent No.: US 9,671,743 B2
(45) Date of Patent: *Jun. 6, 2017

(54) IMAGE FORMING APPARATUS, IMAGE FORMING SYSTEM AND IMAGE FORMING MAINTENANCE METHOD (71) Applicant: Konica Minolta, Inc., Chiyoda-ku, Tokyo (JP)

(72) Inventor: Takemasa Ikeda, Tokyo (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/283,559

(22) Filed: Oct. 3, 2016

(65) Prior Publication Data
US 2017/0023906 A1 Jan. 26, 2017

Related U.S. Application Data (63) Continuation of application No. 14/842,412, filed on Sep. 1, 2015, now Pat. No. 9,469,130.

(30) Foreign Application Priority Data

Sep. 16, 2014 (JP) ................................. 2014-188122

(51) Int. Cl.
*G06K 15/00* (2006.01)
*G03G 21/00* (2006.01)
(Continued)

(52) U.S. Cl.
CPC .............. *G03G 21/00* (2013.01); *B41J 15/00* (2013.01); *G03G 15/502* (2013.01); *G03G 15/55* (2013.01);
(Continued)

(58) Field of Classification Search
None
See application file for complete search history.

(56) References Cited

U.S. PATENT DOCUMENTS 5,038,180 A 8/1991 Niki
5,099,290 A 3/1992 Yokota
(Continued)

FOREIGN PATENT DOCUMENTS

JP S56-110971 A 9/1981
JP H03-238472 A 10/1991
(Continued)

OTHER PUBLICATIONS

Office Action (Notification of Reasons for Refusal) issued on Nov. 2, 2016, by the Japanese Patent Office in corresponding Japanese Patent Application No. 2014-188122 and English Translation of the Office Action. (10 pages).

*Primary Examiner* — Dov Popovici
(74) *Attorney, Agent, or Firm* — Buchanan Ingersoll & Rooney PC (57) ABSTRACT An image forming apparatus including a conveying unit conveying a continuous paper; an image forming unit forming an image on an image carrier and printing the image on the continuous paper conveyed by the conveying unit; and a control unit controlling the image forming apparatus; wherein when a progress state of the image forming apparatus reaches a reference, the control unit performs a maintenance operation by forming an image for maintenance on the image carrier of the image forming unit, after interrupting the printing based on a job when the job is being executed, and when the job is to be executed, the control unit determines whether the progress state of the image forming apparatus exceeds the reference before the job is completed prior to the maintenance operation, and, when the progress
(Continued)

state exceeds the reference, issues an alarm regarding the interruption of the printing based on the job.

28 Claims, 7 Drawing Sheets

(51) Int. Cl.
*B41J 15/00* (2006.01)
*G03G 15/00* (2006.01)
*G06F 3/12* (2006.01)
*G06K 15/02* (2006.01)

(52) U.S. Cl.
CPC ..... *G03G 15/6517* (2013.01); *G03G 15/5058* (2013.01); *G03G 2215/00569* (2013.01); *G06K 15/022* (2013.01)

(56) References Cited

U.S. PATENT DOCUMENTS

| | | | |
|---|---|---|---|
| 9,469,130 B2 * | 10/2016 | Ikeda | ............ B41J 15/00 |
| 2006/0092216 A1 | 5/2006 | Yamazaki | |
| 2007/0053710 A1 | 3/2007 | Shibaki et al. | |
| 2010/0245876 A1 | 9/2010 | Nakamaru | |
| 2011/0236107 A1 | 9/2011 | Sugiura | |
| 2014/0064747 A1 | 3/2014 | Numazu | |

FOREIGN PATENT DOCUMENTS

| | | |
|---|---|---|
| JP | 2006-127500 A | 5/2006 |
| JP | 2007-72294 A | 3/2007 |
| JP | 2008-268423 A | 11/2008 |
| JP | 2009-078886 A | 4/2009 |
| JP | 2010-97132 A | 4/2010 |
| JP | 2010-247518 A | 11/2010 |
| JP | 2014-52433 A | 3/2014 |

* cited by examiner

IMAGE FORMING APPARATUS, IMAGE FORMING SYSTEM AND IMAGE FORMING MAINTENANCE METHOD

CROSS-REFERENCE TO RELATED APPLICATIONS

The present application is a continuation of U.S. patent application Ser. No. 14/842,412, filed Sep. 1, 2015, which claims priority under 35 U.S.C. §119 to Japanese Patent Application No. 2014-188122, filed Sep. 16, 2014. The contents of this application are incorporated herein by reference in their entirety.

BACKGROUND OF THE INVENTION

Field of the Invention

The present invention relates to an image forming apparatus which forms an image on an image carrier according to a progress state of the image forming apparatus to perform maintenance operation, an image forming system and an image forming maintenance method.

Description of the Related Art

An image forming apparatus forms an image on an image carrier based on a job and performs a printing on a paper by transferring the image from the image carrier to the paper being conveyed. The image carrier is, for example, a photoreceptor on which a toner image is formed, or an intermediate transfer belt to which the toner image is transferred from the photoreceptor.

By the way, in accordance with duration of use of the image forming apparatus, image quality degrades, and operation failures, change in image quality, or the like, occur. For example, at an image forming unit, after an image on the image carrier is transferred, a toner which has not been transferred remains on an image carrier. Therefore, a cleaning blade is provided at the image carrier at a downstream side of a transfer region in a rotation direction, and residues such as a toner are swept and removed from the image carrier by the cleaning blade being made abut on a surface of the image carrier. However, if such cleaning removal operation is performed for a long period, friction resistance between the cleaning blade and the image carrier increases, which causes defects such as turn-up and chatter of the cleaning blade.

Meanwhile, it is known that the toner functions as a lubricant (friction reducing agent), and maintenance for reducing friction resistance of the image carrier is sometimes performed by making use of this function effectively to form an image patch on the image carrier when a printing distance becomes a predetermined distance.

Further, with an image forming apparatus, it is known that maximum density, gradation characteristics, tone, or the like, of an image which are parts of parameters of image quality fluctuate according to a cumulative number of printed sheets, or the like. Therefore, in order to achieve appropriate image quality, maintenance is regularly performed by forming an image patch on an image carrier, reading this image patch using an optical sensor, or the like, and executing image stabilization processing for adjusting a charging bias of a charging apparatus, an exposure light amount of an exposure apparatus, a developing bias of a developing apparatus, or the like, according to the read result.

While each of the above-described maintenance can be performed between a previous sheet and a following sheet when normal cut paper is used, in a job using continuous paper, because there is no cut between sheets, it is necessary to interrupt the job to perform the above-described maintenance.

For example, Japanese Patent Laid-Open No. 2009-78886 discloses detecting abnormality, or the like, in image formation performed by a printer engine and cancelling printing or continuing printing according to a degree of the detected abnormality during printing using continuous paper.

However, if a job is interrupted during printing using continuous paper, a cycle of images does not become constant. There is a case where displacement of the cycle of images is required to fall within approximately 1 mm.

Further, if a paper is conveyed to prevent the continuous paper from being heated at a fixing unit while the job is interrupted, because it is impossible to restart printing at the same position due to an image writing timing, or the like, there is a problem that periodicity collapses and a useless interval is provided at the continuous paper. If the continuous paper is subjected to cutting/processing by cutting machine, or the like, in post-processing machine in post-process after printing, there is a problem that the cut/processed position is displaced from an original cut/processed position by processing being performed at the post-processing machine without being aware that the cycle of images is not constant.

The present invention has been made in view of the above-described circumstances, and is basically directed to alarming a user about maintenance operation while performing printing using continuous paper.

SUMMARY OF THE INVENTION

To achieve at least one of the abovementioned objects, an image forming apparatus according to a first aspect of the present invention includes a conveying unit conveying a paper, an image forming unit forming an image on an image carrier and printing the image on the paper being conveyed by the conveying unit, and a control unit controlling the image forming apparatus, and, when a progress state of the image forming apparatus reaches a first reference according to the progress state, the control unit can perform maintenance operation of performing maintenance by forming an image for maintenance on the image carrier of the image forming unit, after interrupting the printing based on a job if the job is being executed, and, when a job using continuous paper is to be executed, the control unit determines whether the progress state exceeds a second reference before the job is completed prior to the maintenance operation, and, if the progress state exceeds the second reference, issues an alarm regarding the interruption.

In the image forming apparatus according to the above-mentioned aspect, it is preferable that the control unit performs conveyance operation of the continuous paper during the maintenance operation.

In the image forming apparatus according to the above-mentioned aspect, it is preferable that the progress state is one of a printing distance, an operation period and the number of printed sheets.

In the image forming apparatus according to the above-mentioned aspect, it is preferable that the control unit performs the determination before the job is started, and, if the alarm is issued, the control unit issues the alarm before the job is started.

In the image forming apparatus according to the above-mentioned aspect, it is preferable that the maintenance comprises forming a cleaning blade turn-up prevention patch or an image patch for stabilization on the image carrier.

In the image forming apparatus according to the abovementioned aspect, it is preferable that the second reference is the same as the first reference, or a progress state prior to a progress state of the first reference.

In the image forming apparatus according to the abovementioned aspect, it is preferable that the progress state is estimated according to content of the job.

In the image forming apparatus according to the abovementioned aspect, it is preferable that the control unit uses a printing distance as the progress state, estimates the printing distance from a size of an original×the number of sheets×the number of copies in the job, and performs the determination according to the printing distance.

In the image forming apparatus according to the abovementioned aspect, it is preferable that the control unit detects a progress state during execution of the job, and determines the interruption according to whether or not the progress state reaches the first reference.

In the image forming apparatus according to the abovementioned aspect, it is preferable that the control unit forms the image for maintenance on the image carrier upon the maintenance operation while performing feed operation of the image carrier.

In the image forming apparatus according to the abovementioned aspect, it is preferable that the control unit makes an inquiry to a user as to whether the interrupted job is restarted or cancelled after the maintenance operation, upon the interruption.

In the image forming apparatus according to the abovementioned aspect, it is preferable that the control unit makes an inquiry to a user as to whether the continuous paper including a margin during the interruption is cut when the interrupted job is restarted, after the maintenance operation.

In the image forming apparatus according to the abovementioned aspect, it is preferable that the control unit adjusts a margin during the interruption so that an image position after the job is restarted matches a position of a cycle of images according to a paper conveyance amount when the interrupted job is restarted, after the maintenance operation.

To achieve at least one of the abovementioned objects, an image forming system according to a first aspect of the present invention includes a conveying unit conveying a paper, an image forming apparatus having an image forming unit forming an image on an image carrier and printing the image on the paper being conveyed by the conveying unit, and a control unit controlling the image forming apparatus, and, when a progress state of the image forming apparatus reaches a first reference according to the progress state, the control unit can perform maintenance operation of performing maintenance by forming an image for maintenance on the image carrier after interrupting the printing based on a job if the job is being executed, and, when a job using continuous paper is to be executed, it is determined whether the progress state exceeds a second reference before the job is completed prior to the maintenance operation, and, if the progress state exceeds the second reference, an alarm regarding the interruption is issued.

To achieve at least one of the abovementioned objects, an image forming maintenance method according to a first aspect of the present invention is an image forming maintenance method of an image forming apparatus forming an image on an image carrier and printing the image on a paper being conveyed, the image forming maintenance method including a maintenance operation step of, when a progress state of the image forming apparatus reaches a first reference according to the progress state, performing maintenance by forming an image for maintenance on the image carrier after interrupting the printing based on a job if the job is being executed, and an alarming step of, when a job using continuous paper is to be executed, determining whether the progress state exceeds a second reference before the job is completed prior to the maintenance operation, and, if the progress state exceeds the second reference, issuing an alarm regarding the interruption.

DETAILED DESCRIPTION OF THE PREFERRED EMBODIMENTS

One embodiment of the present invention will be described below based on the accompanying drawings.

Figure 1:
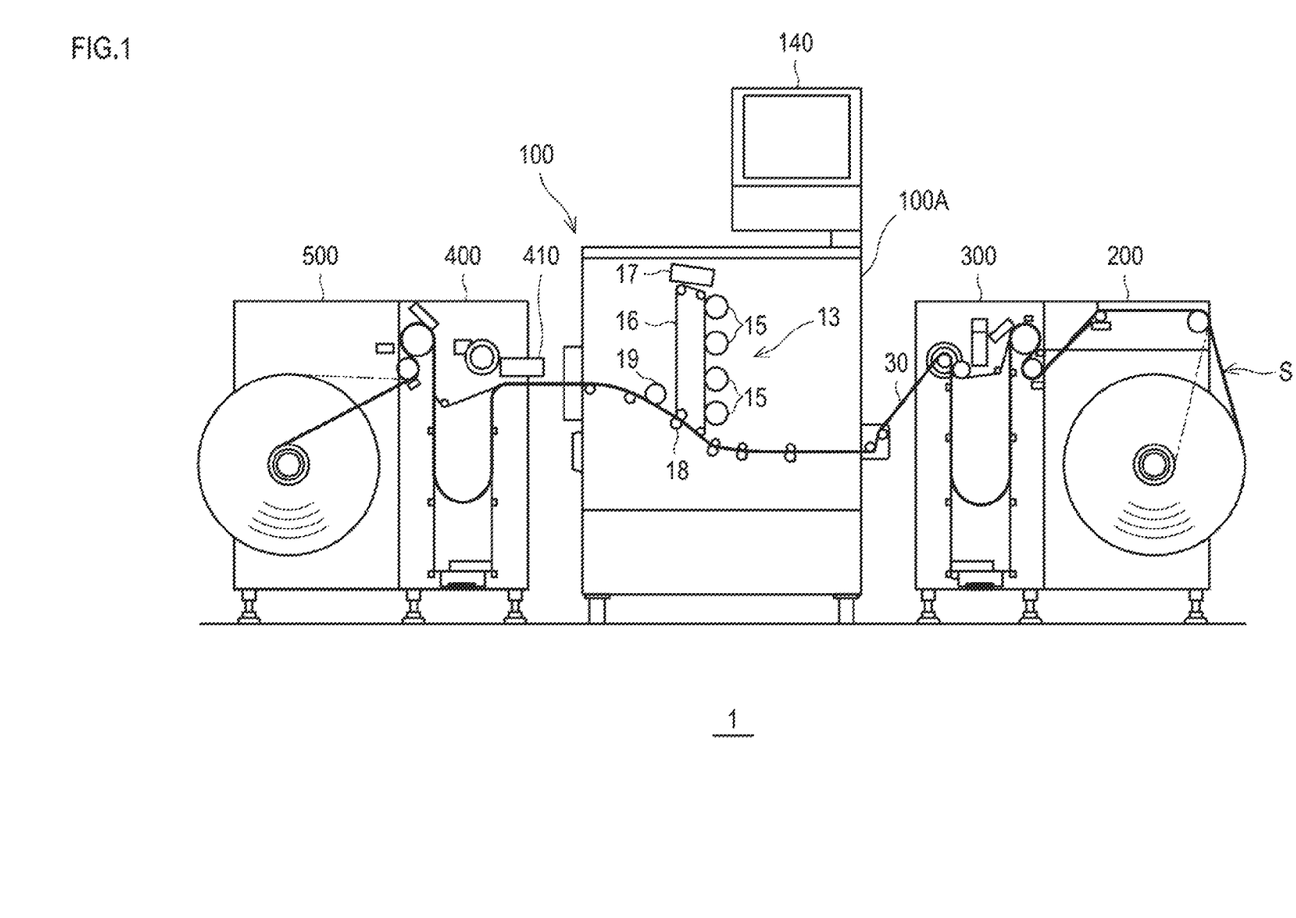
FIG. 1 is a schematic diagram illustrating an image forming apparatus according to one embodiment of the present invention.

As illustrated in FIG. 1, an image forming system 1 includes an image forming apparatus 100, a paper feeding adjusting apparatus 300 is connected at a preceding side of the image forming apparatus 100, and a paper feeding apparatus 200 is connected at a preceding side of the paper feeding adjusting apparatus 300. Further, a paper discharge adjusting apparatus 400 is connected at a paper discharging side of the image forming apparatus 100, and a take-up apparatus 500 is connected at a paper discharging side of the paper discharge adjusting apparatus 400.

The paper feeding apparatus 200 stores and holds continuous paper S which is a roll of paper and feeds paper to the image forming apparatus 100. The take-up apparatus 500 has a function of holding the continuous paper S discharged from the image forming apparatus 100.

The paper feeding adjusting apparatus 300 has a buffer function for absorbing a minute difference of speed between the paper feeding apparatus 200 and the image forming apparatus 100 and bias.

The paper discharge adjusting apparatus 400 has a buffer function for absorbing a minute difference of speed between the take-up apparatus 500 and the printer and bias.

It should be noted that while a roll of paper is used as the continuous paper in this embodiment, the continuous paper is not limited to a roll of paper, and can be any continuous paper, for example, fan folding paper. Further, a material of the continuous paper is not limited to paper, but can be a medium such as cloth.

The image forming system 1 has an image forming unit 13 which forms an image on a paper inside an image forming apparatus body 100A, and an operation display unit 140 for accepting operation by an operator and displaying information is provided at an upper part of the image forming apparatus body 100A. The operation display unit 140 can be a unit which separately includes an operation unit for performing operation and a display unit for performing display, or can be a unit in which an operation unit and a display unit are integrated like a touch panel LCD. The operation display unit 140 can accept printing operation and setting and can display various information.

Further, a paper feed tray for feeding a paper can be provided inside the image forming apparatus body 100A. The image forming unit 13 can print an image on the continuous paper S or a paper sheet. It should be noted that the image forming apparatus 100 can be an apparatus which does not include a paper feed tray.

In the image forming unit 13, a cleaning unit which is not illustrated and which removes a residual toner by contacting each photoreceptor is disposed at a rotation direction side of a position where the photoreceptors are brought into contact with an intermediate transfer belt 16 and at an opposite side of a charger in the rotation direction so as to correspond to the photoreceptors 15 of respective colors. Further, a cleaning blade 17 for removing a residual toner of the intermediate transfer belt 16 is disposed at a rotation direction side of a position where the intermediate transfer belt 16 transfers an image on a paper and at an opposite side of a position where each photoreceptor transfers an image in the rotation direction.

It should be noted that the above-described each photoreceptor is rotationally driven by a drive motor which is not illustrated, and the intermediate transfer belt 16 is also rotationally driven by a drive motor which is not illustrated, in a similar manner to the photoreceptors. Further, in the present embodiment, the image forming apparatus can form a monochrome image such as monochrome.

The image forming system 1 has a conveyance path 30 which leads to the paper feeding adjusting apparatus 300 and the image forming apparatus 100 from the paper feeding apparatus 200 and leads to the paper discharge adjusting apparatus 400 and the take-up apparatus 500 from the image forming apparatus 100.

The conveyance path 30 feeds and conveys a paper and configures a paper conveying unit with a conveyance roller and a conveyance motor which are not illustrated. The continuous paper S stored in the paper feeding apparatus 200 is fed to the conveyance path 30 and conveyed to the image forming unit 13.

A toner image on a paper on which an image is transferred is fixed by heat and pressure being applied at a fixing unit 19, and the paper is discharged to outside of the image forming apparatus 100.

Further, in the image forming system 1, the continuous paper S conveyed through the conveyance path 30 reaches the paper discharge adjusting apparatus 400 at a downstream side of the image forming apparatus 100 in a paper conveyance direction, and a minute difference of speed or bias of the continuous paper is absorbed by a buffer mechanism. The paper discharge adjusting apparatus 400 has a cutter 410 for cutting the continuous paper S and can cut the continuous paper at a desired position.

The continuous paper which has passed through the paper discharge adjusting apparatus 400 reaches the take-up apparatus 500 through the conveyance path 30 and is wound around a roll and held.

It should be noted that while, in the present embodiment, the image forming system 1 is configured with the paper feeding apparatus 200, the paper feeding adjusting apparatus 300, the image forming apparatus 100, the paper discharge adjusting apparatus 400 and the take-up apparatus 500, the configuration of the image forming system 1 is not limited to this. Further, the image forming apparatus can be configured with the image forming apparatus body 100A and other one or more apparatuses.

Figure 2:
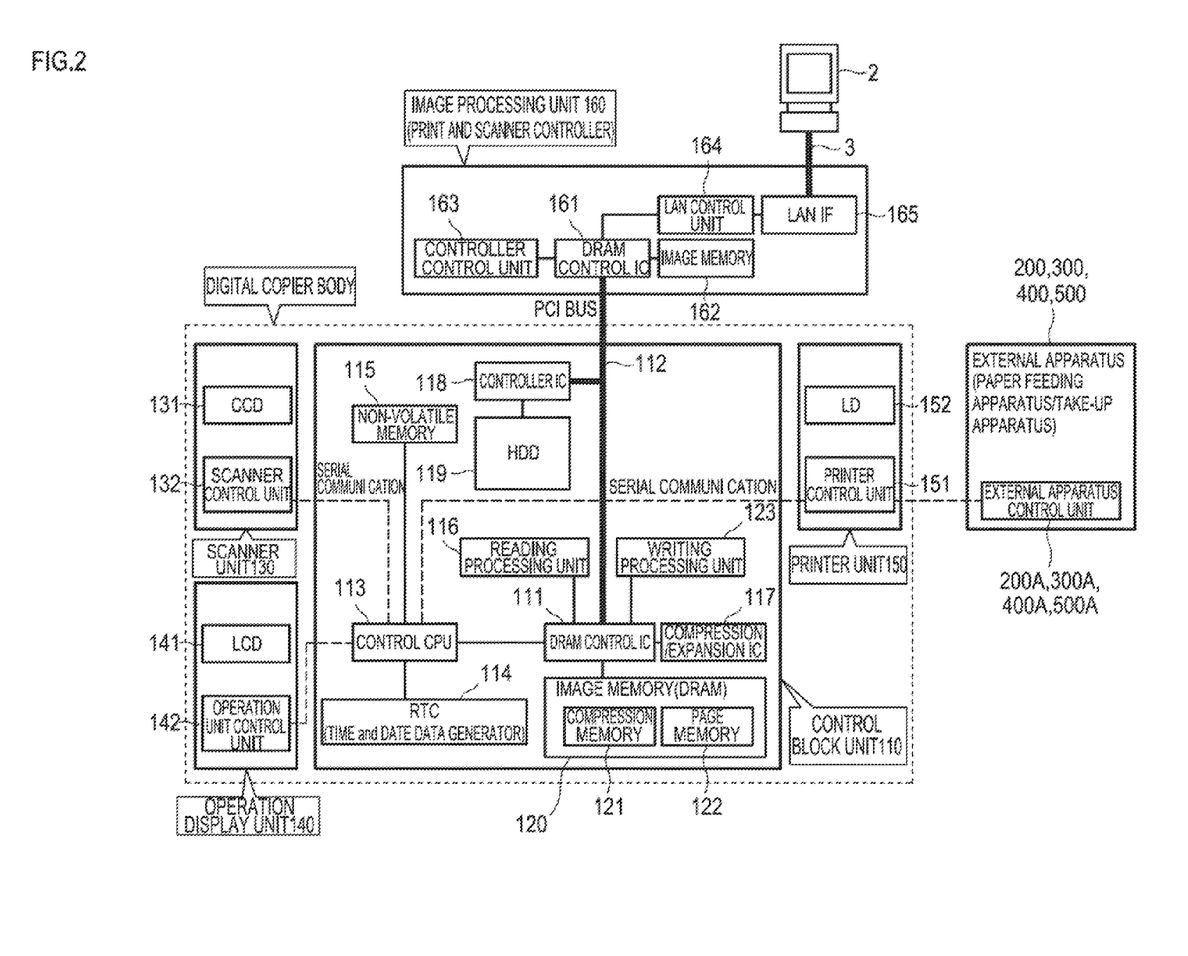
FIG. 2 is a diagram illustrating control blocks of the image forming apparatus and an image forming system according to one embodiment of the present invention.

Next, FIG. 2 is a block diagram illustrating an electric configuration of the image forming system 1 including the image forming apparatus 100, which will be described below.

The image forming apparatus 100 includes, as main components, a copier body having a control block unit 110, a scanner unit 130, an operation display unit 140 and a printer unit 150, and an image processing unit (print and scanner controller) 160 which processes image data input/output into/from external equipment (for example, a terminal (PC) 2) through a LAN.

The control block unit 110 has a PCI bus 112, which is connected to a DRAM control IC 111 inside the control block unit 110. Further, the control block unit 110 includes a control CPU 113, to which the DRAM control IC 111 is connected. Further, a non-volatile memory 115 is connected to the control CPU 113. In the non-volatile memory 115, a program for causing the above-described control CPU 113 to operate, setting data of the image forming system 1, first reference data such as a process control parameter for interrupting a job to perform maintenance operation, second reference data for issuing an alarm regarding interruption of the job, alarm content data, a progress state, image data for maintenance, or the like, are stored. It is also possible to allow a user to set or change various setting data through the operation display unit 140.

It should be noted that, in the present embodiment, the first reference and the second reference which relate to the progress state are set based on a printing distance. Normally, the second reference is set equal to or lower than the first reference. When the second reference is set lower than the first reference, the references can be arbitrarily set while reliability of estimation of a predetermined distance, a period required for preparing maintenance operation in advance, or the like, are taken into account. A cumulative value of the printing distance can be stored in the non-volatile memory 115, an HDD 119, or the like.

Further, in the present invention, the reference relating to the progress state can be made different according to the maintenance operation, and, for example, a cumulative number of printed sheets, an operation period, and an elapsed time after the apparatus is started to be used, or the like, can be used. It should be noted that the second reference can be set based on the first reference, and can be set assuming a time point of the progress state at which an alarm regarding interruption of the job which is performed based on the first reference is desired to be received.

The control CPU 113 which controls the whole of the image forming system 1 and recognizes the state of the overall image forming apparatus, controls image formation, or the like.

Further, the control CPU 113 has an RTC (Time and date data generator) 114 which can measure an operation period, elapsed time after the apparatus is started to be used, or the like, and the measurement results are transmitted to the control CPU 113 and can be used to control the apparatus.

The control CPU 113 updates the stored printing distance in accordance with an increase in the printing distance, and, if the accumulated printing distance reaches the first reference, interrupts a job if the job is being executed, forms an image patch on the photoreceptor 15, transfers the image path on the intermediate transfer belt 16 which is an image carrier, and rotationally moves the intermediate transfer belt 16 so as to be wiped by the cleaning blade 17. This operation is maintenance operation for preventing turn-up of the cleaning blade. The above-described image patch is an image for maintenance.

It should be noted that, in the present embodiment, as the maintenance operation, the image forming unit 13 can be adjusted by forming an image patch on the photoreceptor 15 which is an image carrier and reading the image transferred to the intermediate transfer belt 16. This operation is maintenance operation for stabilization control. The above-described image patch is an image for maintenance.

Further, the control CPU 113 can issue an alarm regarding interruption of the job when the printing distance exceeds the second reference. The alarm can be informed by being displayed at the operation display unit 140 or through sound, light, or the like. Further, it is also possible to transmit notification, email, or the like, to other apparatuses via a network. It should be noted that whether or not to issue an alarm can be designated through operation at the operation display unit.

It should be noted that the control unit is not limited to that provided inside the image forming apparatus body 100A and can be one provided outside the image forming apparatus body 100A as a unit provided in the image forming apparatus. Further, the control unit can be, for example, provided at a server connected to the image forming apparatus through a network to control the image forming apparatus, the image forming system, or the like.

The scanner unit 130 includes a CCD 131 for performing optical reading, and a scanner control unit 132 for controlling the whole of the scanner unit 130. The scanner control unit 132 which is connected to the control CPU 113 so as to be able to perform serial communication with the control CPU 113, is controlled by the control CPU 113. It should be noted that the scanner control unit 132 can be configured with a CPU, a program for causing the CPU to operate, or the like. Image data read by the CCD 131 is subjected to data processing at a reading processing unit 116.

The operation display unit 140 includes an LCD 141 of a touch panel type and an operation unit control unit 142, and the LCD 141 is connected to the operation unit control unit 142, and the operation unit control unit 142 is connected to the control CPU 113 so as to be able to perform serial communication. This configuration allows the control CPU 113 to control the operation display unit 140. It should be noted that the operation unit control unit 142 can be configured with a CPU, a program for causing the CPU to operate, or the like. The operation display unit 140 allows input of settings at the image forming apparatus and operation control conditions such as an operation instruction, further allows display of the setting, a state of machine and information, and is controlled by the control CPU 113.

Further, the DRAM control IC 111 is connected to an image memory 120 comprised of a compression memory 121 and a page memory 122. In the image memory 120, the image data acquired at the scanner unit 130 and image data acquired through the LAN 3 are stored. As described above, the image memory 120 is a storage region of image data, and image data of a job to be printed is stored therein. Further, the DRAM control IC 111 can store image data relating to a plurality of jobs in the image memory 120. That is, image data of a reserved job can be also stored in the image memory 120.

A compression/expansion IC 117 which compresses image data or expands compressed image data is connected to the DRAM control IC 111. Further, a writing processing unit 123 is connected to the DRAM control IC 111. Further, the printer unit 150 includes a printer control unit 151 which controls the whole of the printer unit 150, and the printer control unit 151 is connected to the control CPU 113 and controlled by the control CPU 113. That is, the printer control unit 151 starts/stops printing operation according to a parameter provided from the control CPU 113. The printer unit 150 includes the image forming unit 13, whose operation is controlled by the control CPU 113.

Further, respective external apparatus control units 200A, 300A, 400A and 500A of the paper feeding apparatus 200, the paper feeding adjusting apparatus 300, the paper discharge adjusting apparatus 400 and the take-up apparatus 500 which are external apparatuses, are controllably connected to the control CPU 113, and the operation of these apparatuses is controlled by the external apparatus control units 200A, 300A, 400A and 500A based on instructions from the control CPU 113.

Further, a DRAM control IC 161 of the image processing unit (print and scanner controller) 160 is connected to the PCI bus 112 which is connected to the DRAM control IC 111. In the image processing unit (print and scanner controller) 160, an image memory 162 is connected to the DRAM control IC 161. Further, in the image processing unit (print and scanner controller) 160, a controller control unit 163 is connected to the DRAM control IC 161, and a LAN control unit 164 and a LAN interface 165 are connected to the DRAM control IC 161. The LAN interface 165 is connected to the LAN 3.

Basic operation of the image forming system 1 will be described next.

First, procedure for accumulating image data in the image forming system 1 will be described.

When an image of an original is read at the scanner unit 130 provided at the image forming apparatus 100 to generate image data, the image of the original is optically read from the original using the CCD 131 at the scanner unit 130. At this time, the scanner control unit 132 which receives an instruction from the control CPU 113 controls operation of the CCD 131. The image read using the CCD 131 is subjected to data processing at the reading processing unit 116, and the image data subjected to data processing is compressed at the compression/expansion IC 117 using a predetermined method and stored in the compression memory 121 through the DRAM control IC 111. Further, when print data is stored in the HDD 119, compressed print data is forwarded through the DRAM control IC 111 and a controller IC 118 and stored in the HDD 119.

The print data stored in the compression memory 121 and the HDD 119 can be managed as a job by the control CPU 113. The image memory (DRAM) 120 and the HDD 119 serve as storage units which store image data.

When image data is acquired from outside, for example, image data transmitted from a terminal (PC) 2 through the LAN 3 is stored in the image memory 162 by the DRAM control IC 161 through the LAN interface 165 and the LAN control unit 164.

The print data in the image memory 162 is once stored in the page memory 122 through the DRAM control IC 161, the PCI bus 112 and the DRAM control IC 111. When the print data is page description data, the print data can be made a raster image by the controller control unit 163 through RIP processing.

The print data stored in the page memory 122 is sequentially transmitted to the compression/expansion IC 117 through the DRAM control IC 111, subjected to compression processing and stored in the compression memory 121 through the DRAM control IC 111. Further, when print data is stored in the HDD 119, the print data is stored in the HDD 119 through the DRAM control IC 111 and the controller IC 118. These print data is managed by the control CPU 113 in a similar manner as described above. The image memory (DRAM) 120 and the HDD 119 serve as storage units which store image data.

When an image is output from the image forming system 1, that is, the image forming system 1 is used as a copier or a printer, if the print data stored in the compression memory 121 is used, the print data in the compression memory 121 is transmitted to the compression/expansion IC 117 through the DRAM control IC 111, and the data is expanded. When the print data stored in the HDD 119 is used, the print data in the HDD 119 is transmitted to the compression/expansion IC 117 through the controller IC 118 and the DRAM control IC 111, and the data is expanded. The expanded image data is transmitted to the writing processing unit 123 and is written in each photoreceptor 15 at the LD 152 according to print conditions associated with the print data.

Further, in the printer unit 150, the printer control unit 151 and the external apparatus control units 200A, 300A, 400A and 500A which receive instructions from the control CPU 113 control respective units. At this time, control is performed based on the print conditions as necessary. In the image forming unit 13, after a toner image written in each photoreceptor 15 is transferred to the intermediate transfer belt 16, the image is transferred to the continuous paper S supplied from the paper feeding apparatus 200 through the conveying unit including the conveyance path, and fixed at the fixing unit 19. Further, in each photoreceptor 15, after the toner image is transferred to the intermediate transfer belt 16, a residual toner is removed by each cleaning unit. Further, also in the intermediate transfer belt 16, after a toner image is transferred to a paper, a residual toner is removed by the cleaning blade 17.

The continuous paper S on which an image is formed is sequentially conveyed to the paper discharge adjusting apparatus 400 by the conveyance path 30 through a fixing and conveyance roller, and wound around a roll by the take-up apparatus 500 at a further downstream side.

In the image forming unit 13, when images over a plurality of pages are formed on the continuous paper S, an image of each page is formed based on a predetermined image interval. The predetermined image interval is stored in a non-volatile manner in the non-volatile memory 115, or the like. It is also possible to allow an operator to set an image interval through the operation display unit 140.

It should be noted that an image interval of each page is minimized (for example, 1 mm) to reduce waste paper.

Figure 3:
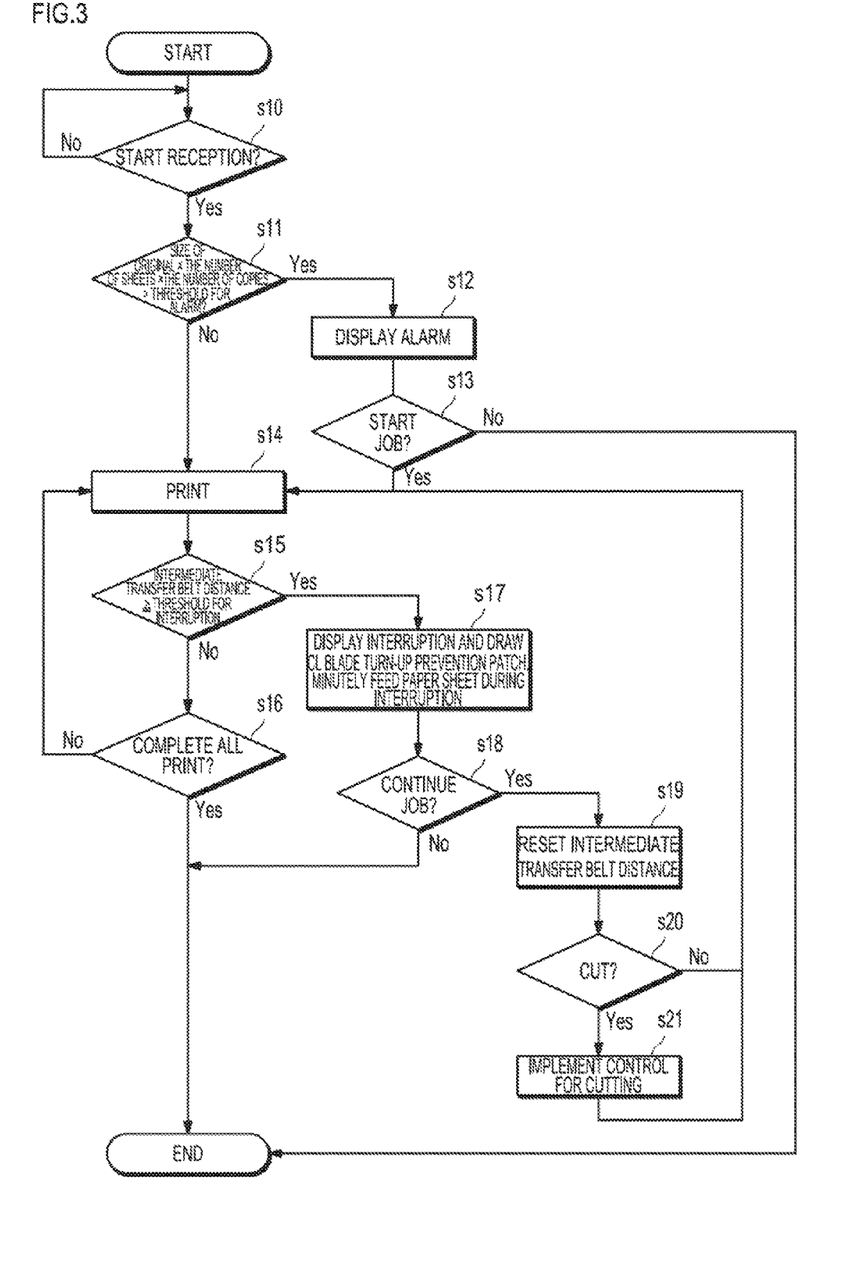
FIG. 3 is a flowchart illustrating printing procedure according to one embodiment of the present invention.

Procedure of executing a job using the continuous paper will be described next based on the flowchart in FIG. 3. The following procedure is executed under control by the control unit.

In association with start of the procedure, it is determined whether reception of a job using the continuous paper is started (step s10). If a job is not received (step s10: No), the apparatus stands by for reception.

If a job is received (step s10: Yes), it is determined whether a size of an original×the number of sheets×the number of copies exceeds a threshold for an alarm from job information (step s11). The size of the original includes a length for margins. The size of the original×the number of sheets×the number of copies corresponds to a printing distance when the job is executed, and the printing distance can be estimated through this calculation. Further, the threshold for an alarm corresponds to the second reference.

It should be noted that when progress information is the number of printed sheets, the progress information can be acquired by accumulating the number of printed sheets using the job information and storing the number of printed sheets in the non-volatile memory 115 or the HDD 119 to update the number. Further, an operation period or elapsed time since the apparatus was used can be acquired by calculating an integrated value of the operation period or elapsed time since the apparatus was used based on a measurement value obtained by the RTC (Time and date data generator) 114.

If the printing distance estimated through the above-described calculation is determined to exceed the threshold for an alarm (step s11: Yes), an alarm is displayed (step s12).

Figure 5:
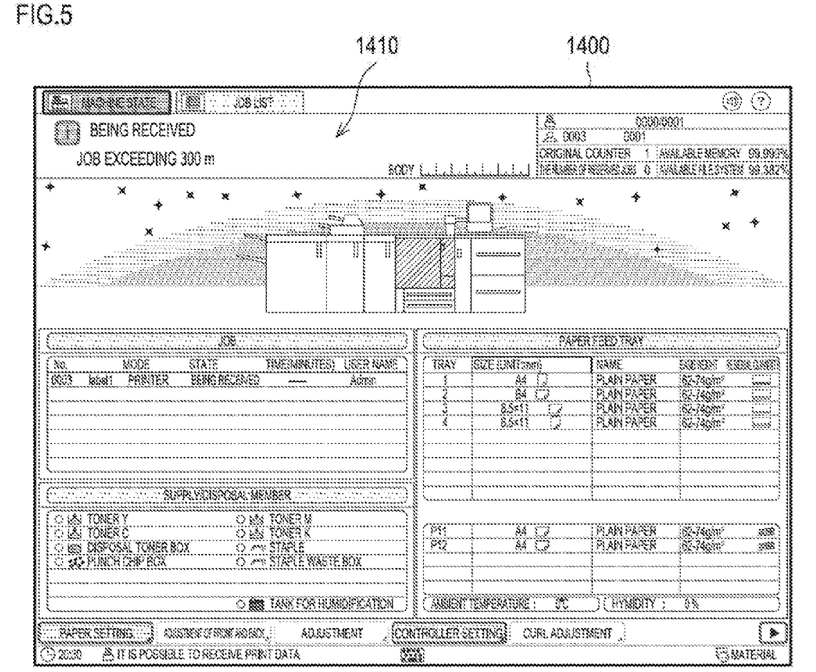
FIG. 5 is a diagram illustrating a screen on which an alarm regarding interruption of a job is displayed according to one embodiment of the present invention.

The alarm is displayed, for example, in a message field 1410 of a setting screen 1400 illustrated in FIG. 5. For example, when the second reference is set at 300 m as the printing distance, if the estimated printing distance exceeds 300 m, an alarm for alarming that the second reference is exceeded can be displayed. It should be noted that the alarm is not particularly limited, and it is also possible to issue an alarm for alarming that the printing distance is close to the first reference.

It should be noted that while, in the present embodiment, the above-described determination is performed prior to execution of the job, it is also possible to perform the determination and alarm after execution of the job.

After the alarm is displayed (step s12), it is determined whether to start the job (step s13). Whether or not to start the job can be determined by, for example, making an inquiry through the operation display unit 140, or the like, and the user selecting whether or not to start the job through the operation display unit 140. It is also possible to allow the user to select cancellation of the execution.

When the job is started (step s13: Yes), printing is executed for one size of an original (step s14), while when the job is not started (step s13: No) the procedure is finished.

Further, if it is determined that the printing distance estimated through the above-described calculation does not exceed the threshold for an alarm (step s11: No), printing is executed for one size of an original (step s14).

After printing is executed (step s14), it is determined whether an intermediate transfer belt distance reaches a threshold for interruption (step s15). The intermediate transfer belt distance corresponds to the printing distance, and the threshold for interruption corresponds to the first reference.

If the intermediate transfer belt distance does not reach the threshold for interruption (step s15: No), it is determined whether all the printing is completed (step s16), and, if all the printing is completed (step s16: Yes), the procedure is finished. If all the printing is not completed (step s16: No), the procedure returns to step s14 and printing of a next size of an original is executed.

If the intermediate transfer belt distance reaches the threshold for interruption in step s15 (step s15: Yes), interruption is displayed, and maintenance operation of drawing a cleaning (CL) blade turn-up prevention patch on the image carrier and moving the image carrier is performed (step s17).

Further, while the job is stopped, the continuous paper S is minutely fed so as to suppress being heated by the fixing unit 19.

FIG. 4 illustrates an example of an image arrangement state of the continuous paper S when the printing distance reaches the threshold for interruption, the job is interrupted, maintenance operation is performed, and the job is restarted.

Figure 4A:
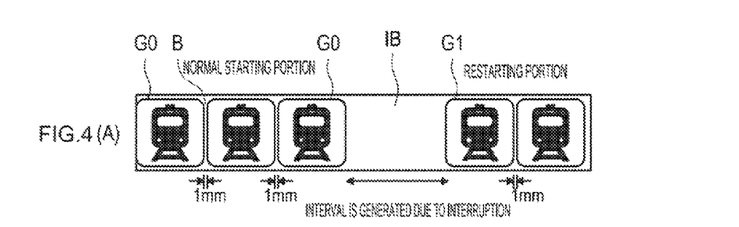
FIGS. 4(A) and 4(B) are diagrams illustrating image arrangement of continuous paper on which maintenance operation is performed according to one embodiment of the present invention.

As illustrated in FIG. 4(A), an original image G0 is formed along with a margin B at a predetermined cycle. However, if the job is interrupted, a margin IB is formed due to the interruption, an interval is formed due to the interruption between an image G1 after the job is restarted and the image G0 which is formed last after the job is normally started, and a cycle of images is displaced.

After the maintenance operation (step s17), an inquiry as to whether to restart the job is made to the user (step s18). The user can designate whether or not to restart the job through the operation display unit 140. Further, it is also possible to perform setting so that the job is restarted if an instruction from the user has not been received for a predetermined period. If the job is not restarted (step s18: No), the procedure is finished.

The above-described inquiry to the user can be made during the maintenance operation or prior to the maintenance operation.

Figure 6:
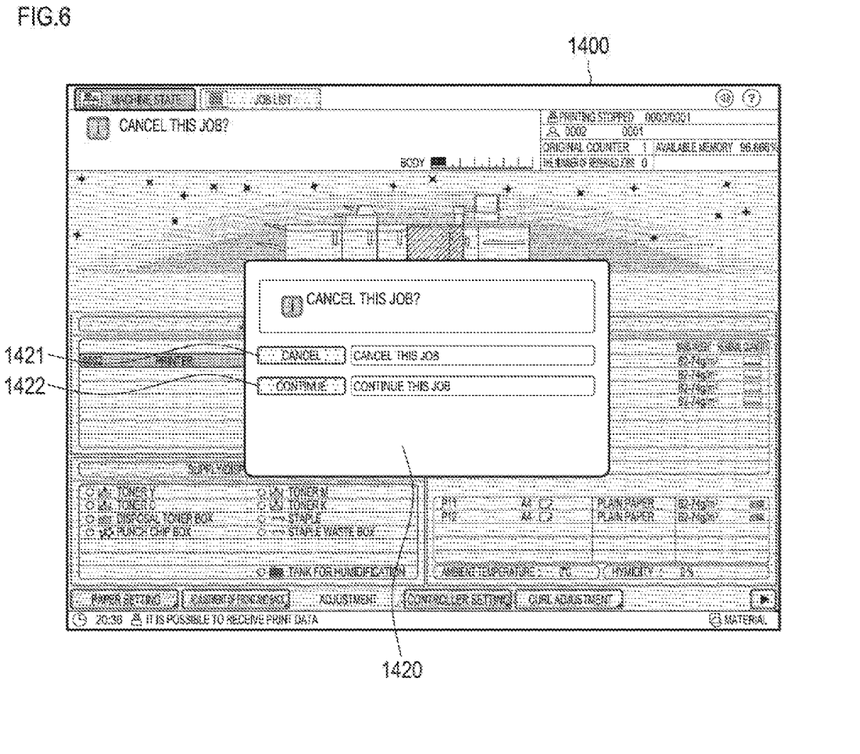
FIG. 6 is a diagram illustrating a screen for inquiring whether to cancel a job when the job is to be interrupted according to one embodiment of the present invention.

FIG. 6 illustrates the setting screen 1400 of the operation display unit on which whether to cancel or restart the job is displayed, and a cancel/restart inquiry screen 1420 is pop-up displayed. In the cancel/restart inquiry screen 1420, a cancel button 1421 and a restart button 1422 are displayed so as to be able to be depressed, and whether to cancel or restart the job can be selected through depression of these buttons.

If the job is restarted (step s18: Yes), the intermediate transfer belt distance is reset (step s19).

At this time, because the maintenance operation has been performed once, the intermediate transfer belt distance is reset. However, it is also possible to rewrite the intermediate transfer belt distance to the first reference and the second reference according to the next cycle without resetting the intermediate transfer belt distance.

After the intermediate transfer belt distance is reset (step s19), it is determined whether to cut the continuous paper (step s20). An inquiry as to whether or not to cut the continuous paper can be made to the user, and the user can designate whether or not to cut the continuous paper through the operation display unit 140, or the like. It is also possible to determine that the continuous paper should be cut or should not be cut if an instruction has not been received for a predetermined period, and perform processing. If the continuous paper is not cut (step s20: No), the procedure returns to step s14, and printing is executed.

Figure 7:
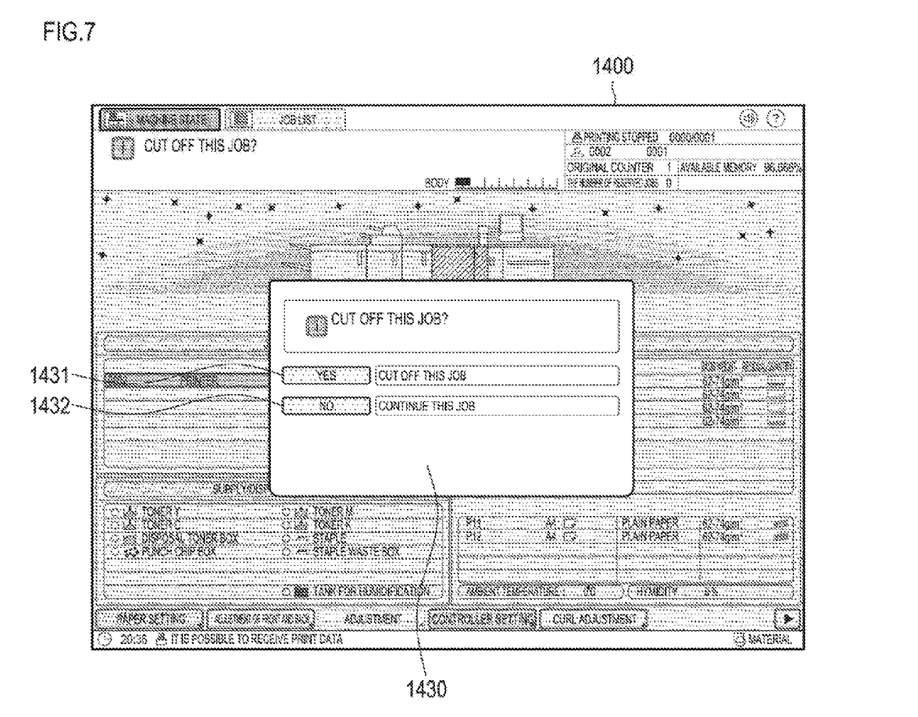
FIG. 7 is a diagram illustrating a screen for inquiring whether to cut continuous paper on which a job is output when the job is to be interrupted according to one embodiment of the present invention.

FIG. 7 illustrates the setting screen 1400 through which an inquiry as to whether or not to cut the job is made, and a cutting inquiry screen 1430 is pop-up displayed. In the cutting inquiry screen 1430, regarding cutting the job, a Yes button 1431 and a No button 1432 are displayed so as to be able to be depressed, whether to cut the job can be selected through depression of these buttons.

If the job is cut (step s20: Yes), control for cutting the job is implemented (step 21), and the procedure returns to execution of printing in step s14. The above-described inquiry to the user can be made during the maintenance operation or prior to the maintenance operation.

Figure 4B:
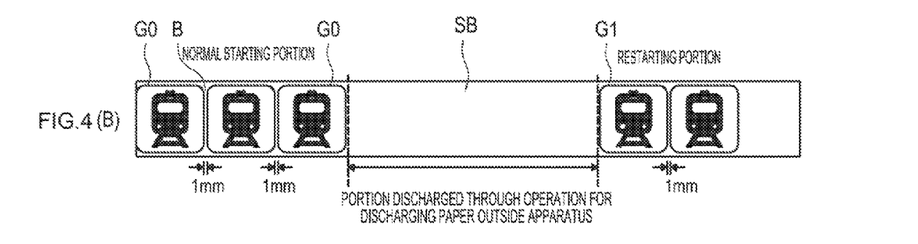

It should be noted that in the control for cutting the job, the continuous paper inside the image forming apparatus 100 is fed a fixed distance, the last image G0 is discharged to outside of the apparatus, and, as illustrated in FIG. 4(B), a margin during interruption of the job is cut at an interrupted position by the cutter 410 provided at the paper discharge adjusting apparatus 400, and the procedure shifts to post-processing process. Then, printing of the job is restarted on the remaining continuous paper, and, as illustrated in FIG. 4(B), the paper is further cut using the cutter 410 so that the image G1 after the job is restarted becomes a start position, and the job is restarted. This cutting operation is selected when it is desired to prevent a situation where an interrupted position is lost by the paper being rolled up by the take-up apparatus as is although the cycle of the images is collapsed.

It should be noted that while, in the above-described procedure, if the job is not cut when the job is restarted, the job is restarted as is, it is also possible to make the image after the job is restarted match the cycle of images by controlling conveyance of the continuous paper and adjusting a margin while the job is interrupted. In this case, after step s20, a margin can be automatically adjusted, or whether to adjust a margin can be determined. It is also possible to make an inquiry as to whether to adjust a margin to the user through the operation display unit 140, and adjust a margin according to an operation instruction from the user.

As described above, according to the present embodiment, because maintenance operation is alarmed to the user in advance, and the user knows a possibility that the maintenance operation will be started before printing of a job is started, for example, it is possible to provide advantages of being capable of cancelling printing for which a cycle of printed images is not constant, setting the number of copies again and dealing with only printing for which a cycle is constant, or being capable of letting the user know that it is necessary to modify setting of post-processing machine in post-process because the user knows that the cycle is not constant although printing is performed.

While the present invention has been described above based on the above-described embodiment, the above-described embodiment can be modified as appropriate without departing from the scope of the present invention.

What is claimed is:

1. An image forming apparatus comprising:
    a conveying unit conveying a continuous paper;
    an image forming unit forming an image on an image carrier and printing the image on the continuous paper conveyed by the conveying unit; and
    a control unit controlling the image forming apparatus;
    wherein when a progress state of the image forming apparatus reaches a reference, the control unit performs a maintenance operation by forming an image for maintenance on the image carrier of the image forming unit, after interrupting the printing based on a job when the job is being executed, and
    when the job is to be executed, the control unit determines whether the progress state of the image forming apparatus exceeds the reference before the job is completed prior to the maintenance operation, and, when the progress state exceeds the reference, issues an alarm regarding the interruption of the printing based on the job.

2. The image forming apparatus according to claim 1, wherein the control unit performs a conveyance operation of the continuous paper during the maintenance operation.

3. The image forming apparatus according to claim 1, wherein the progress state is one of a printing distance, an operation period, and a number of printed sheets.

4. The image forming apparatus according to claim 1, wherein the control unit performs the determination before the job is started, and, if the alarm is issued, the control unit issues the alarm before the job is started.

5. The image forming apparatus according to claim 1, wherein the maintenance operation comprises forming a cleaning blade turn-up prevention patch or an image patch for stabilization on the image carrier.

6. The image forming apparatus according to claim 1, wherein the progress state is estimated according to contents of the job.

7. The image forming apparatus according to claim 1, wherein the control unit uses a printing distance as the progress state, estimates the printing distance from a size of an original×a number of sheets×a number of copies in the job, and performs the determination according to the printing distance.

8. The image forming apparatus according to claim 1, wherein the control unit forms the image for maintenance on the image carrier upon the maintenance operation while performing a feed operation of the image carrier.

9. The image forming apparatus according to claim 1, wherein the control unit makes an inquiry to a user as to whether the interrupted job is restarted or cancelled after the maintenance operation, upon the interruption.

10. The image forming apparatus according to claim 1, wherein the control unit makes an inquiry to a user as to whether the continuous paper including a margin during the interruption is cut when the interrupted job is restarted, after the maintenance operation.

11. The image forming apparatus according to claim 1, wherein the control unit adjusts a margin during the interruption so that an image position after the job is restarted matches a position of a cycle of images according to a paper conveyance amount when the interrupted job is restarted, after the maintenance operation.

12. An image forming system comprising the image forming apparatus according to claim 1.

13. An image forming apparatus comprising:
a conveying unit conveying a continuous paper;
an image forming unit forming an image on an image carrier and printing the image on the continuous paper conveyed by the conveying unit; and
a control unit controlling the image forming apparatus;
wherein when a progress state of the image forming apparatus reaches a first reference, the control unit performs a maintenance operation by forming an image for maintenance on the image carrier of the image forming unit, after interrupting the printing based on a job when the job is being executed, and
when the job is to be executed, the control unit determines whether the progress state of the image forming apparatus exceeds a second reference before the job is completed prior to the maintenance operation, and, when the progress state exceeds the second reference, issues an alarm regarding the interruption of the printing based on the job.

14. The image forming apparatus according to claim 13, wherein the control unit performs a conveyance operation of the continuous paper during the maintenance operation.

15. The image forming apparatus according to claim 13, wherein the progress state is one of a printing distance, an operation period and a number of printed sheets.

16. The image forming apparatus according to claim 13, wherein the control unit performs the determination before the job is started, and, if the alarm is issued, the control unit issues the alarm before the job is started.

17. The image forming apparatus according to claim 13, wherein the maintenance operation comprises forming a cleaning blade turn-up prevention patch or an image patch for stabilization on the image carrier.

18. The image forming apparatus according to claim 13, wherein the second reference is the same as the first reference, or a progress state prior to the progress state of the first reference.

19. The image forming apparatus according to claim 13, wherein the progress state is estimated according to content of the job.

20. The image forming apparatus according to claim 13, wherein the control unit uses a printing distance as the progress state, estimates the printing distance from a size of an original×a number of sheets×a number of copies in the job, and performs the determination according to the printing distance.

21. The image forming apparatus according to claim 13, wherein the control unit detects a progress state during execution of the job, and determines the interruption according to whether or not the progress state reaches the first reference.

22. The image forming apparatus according to claim 13, wherein the control unit forms the image for maintenance on the image carrier upon the maintenance operation while performing feed operation of the image carrier.

23. The image forming apparatus according to claim 13, wherein the control unit makes an inquiry to a user as to whether the interrupted job is restarted or cancelled after the maintenance operation, upon the interruption.

24. The image forming apparatus according to claim 13, wherein the control unit makes an inquiry to a user as to whether the continuous paper including a margin during the interruption is cut when the interrupted job is restarted, after the maintenance operation.

25. The image forming apparatus according to claim 13, wherein the control unit adjusts a margin during the interruption so that an image position after the job is restarted matches a position of a cycle of images according to a paper conveyance amount when the interrupted job is restarted, after the maintenance operation.

26. An image forming system comprising the image forming apparatus according to claim 13.

27. An image forming maintenance method for an image forming apparatus, the method comprising:
conveying a continuous paper by a conveying unit;
forming an image on an image carrier and printing the image on the continuous paper conveyed by the conveying unit; and
when a progress state of the image forming apparatus reaches a reference, performing a maintenance operation by forming an image for maintenance on the image carrier, after interrupting the printing based on a job when the job is being executed, and
when the job is to be executed, determining whether the progress state of the image forming apparatus exceeds the reference before the job is completed prior to the maintenance operation, and, when the progress state exceeds the reference, issuing an alarm regarding the interruption of the printing based on the job.

28. An image forming maintenance method for an image forming apparatus, the method comprising:
conveying a continuous paper by a conveying unit;
forming an image on an image carrier and printing the image on the continuous paper conveyed by the conveying unit; and
when a progress state of the image forming apparatus reaches a first reference, performing a maintenance operation by forming an image for maintenance on the image carrier, after interrupting the printing based on a job when the job is being executed, and when the job is to be executed, determining whether the progress state of the image forming apparatus exceeds a second reference before the job is completed prior to the maintenance operation, and, when the progress state exceeds the second reference, issuing an alarm regarding the interruption of the printing based on the job.

* * * * *